(12) United States Patent
Kliesch et al.

(10) Patent No.: US 7,803,857 B2
(45) Date of Patent: Sep. 28, 2010

(54) MONO- OR MULTILAYER STABILIZED POLYESTER FILM

(75) Inventors: Holger Kliesch, Ginsheim-Gustavsburg (DE); Ursula Murschall, Nierstein (DE); Ingo Fischer, Heistenbach (DE); Martin Jesberger, Mainz (DE); Lothar Bothe, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 308 days.

(21) Appl. No.: 11/958,406

(22) Filed: Dec. 18, 2007

(65) Prior Publication Data

US 2008/0146703 A1   Jun. 19, 2008

(30) Foreign Application Priority Data

Dec. 19, 2006  (DE) ................ 10 2006 059 888
Jan. 3, 2007   (DE) ................ 10 2007 001 443
Sep. 24, 2007  (DE) ................ 10 2007 045 581

(51) Int. Cl.
   *C08K 5/3492* (2006.01)
   *B32B 27/06* (2006.01)
   *B32B 27/00* (2006.01)

(52) U.S. Cl. ............................. 524/100; 428/480

(58) Field of Classification Search ............ 524/100; 428/480
   See application file for complete search history.

(56) References Cited

U.S. PATENT DOCUMENTS

| 2003/0054169 A1 | 3/2003 | Murschall et al. |
| 2004/0067379 A1 | 4/2004 | Peiffer et al. |
| 2006/0234061 A1 | 10/2006 | Buckel et al. |

FOREIGN PATENT DOCUMENTS

| DE | 101 35 795 A1 | 4/2002 |
| EP | 0 815 089 A1 | 1/1998 |
| FR | 2812299 A1 | 2/2002 |
| WO | WO 98/06575 A1 | 2/1998 |
| WO | WO 01/53091 A1 | 7/2001 |
| WO | WO 01/60613 A1 | 8/2001 |

*Primary Examiner*—Kriellion A Sanders
(74) *Attorney, Agent, or Firm*—ProPat, L.L.C.

(57) ABSTRACT

Biaxially oriented mono- or multilayered polyester film containing at least one UV stabilizer according to formula (I):

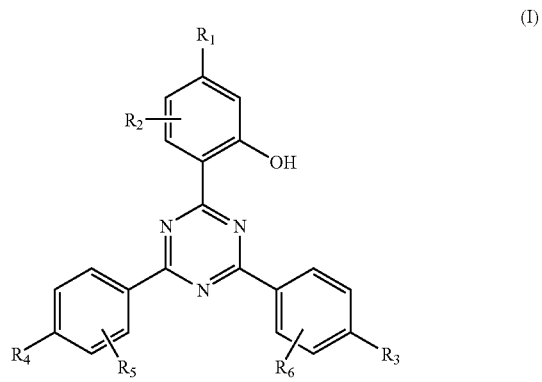

(I)

wherein
$R_1$ is —H, C1-C12-alkyl, -aryl, —S—(C1-C12)-alkyl or —O—$R_9$ or —O—(C1-C5)-alkylene-C(O)O—$R_9$, wherein
$R_9$ is -aryl or C1-C12-alkyl,
$R_3$ and $R_4$

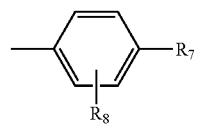

and
$R_2$, $R_5$, $R_6$, $R_7$ and $R_8$ independently from each other represent —H, —(C1-C12)-alkyl, —O—(C1-C12)-alkyl, -aryl or —O-aryl,
wherein said alkyl radicals with more than two C-atoms and alkylene radicals with more than one C-atom can be linear or branched.

21 Claims, No Drawings

MONO- OR MULTILAYER STABILIZED POLYESTER FILM

CROSS-REFERENCE TO RELATED APPLICATIONS

This application claims priority to German Patent Application No. 10 2006 059 888.1, filed Dec. 19, 2006; German Patent Application No. 10 2007 001 443.2, filed Jan. 3, 2007; and German Patent Application No. 10 2007 045 581.1, filed Sep. 24, 2007, each of which are hereby incorporated herein by reference in their entirety.

FIELD OF THE INVENTION

This invention relates to a mono- or multilayer polyester film stabilized against UV-light. The invention further relates to a process for the manufacture of the film and to its use.

BACKGROUND OF THE INVENTION

Known UV-stabilizers for polymers mostly are derived from the substance classes of triazines, benzotriazoles, benzophenones, sterically hindered amines (HALS=hindered amine light stabilizers) and many more. A list can be found e.g. in DE-A-101 35 795. UV-stabilized, oriented polyester films are also known and the particular activity of stabilizers from the class of triazines for oriented films has also been described (see e.g. WO 98/06575).

WO 98/06575 also points to the varying suitability within the class of triazines and to the commercially available TINUVIN® 1577 (=2-(4,6-diphenyl-1,3,5 triazine-2-yl)-5-(hexyl)oxyphenol, manufactured by Ciba SC, CH) which is particularly suitable.

Further DE-A-101 35 795 describes differences within the group of triazines and proposes to use a number of new as well as known triazines for films. This document also mentions polyester films, however, examples have only been carried out for polyolefin films. Further triazines with bisphenyl units are described as suitable (exemplary compounds a/b/c/d/e/f/g) and the commercially available TINUVIN® 1577 (compound j) is described as particularly suitable. Moreover combinations with other UV-stabilizers are considered, among them compounds from the HALS class. Due to the number of possible variations the total number of potentially suitable stabilizers mentioned in formulas amounts to several thousands. Transfer from polyolefins to (particularly aromatic) polyesters does not appear feasible because the UV absorption and the processing conditions are distinctly different and stabilizers correspondingly must have other properties.

DE-A-101 35 795 as well as WO 98/06575 mention TINUVIN® 1577 as particularly suited and preferred stabilizer.

Despite of its advantages TINUVIN® 1577 has considerable drawbacks, especially in the processing of oriented polyester films. In the melt, similarly to other non-polymeric UV stabilizers, TINUVIN® 1577 does not contribute appreciably to the total viscosity. Because it has to be added in amounts ranging from 1 to 5% by weight in order to achieve commercial grade UV stability (in general a minimum of 5 years lifetime under weather of central European climate conditions or, respectively, 2 years Florida test) a considerable drop in viscosity occurs in film production. This drop is undesirable and causes film breaking, stripes and other manufacturing trouble. Further the use of triazine compounds causes odor which is perceived as an annoyance by many. Moreover triazine compounds like TINUVIN® 1577 have a residual absorbance in the visible light spectral range which causes a yellow discoloration of the film.

SUMMARY OF ADVANTAGEOUS EMBODIMENTS OF THE INVENTION

It was an object of the present invention to overcome the above mentioned disadvantages and to provide polyester films with UV stability at least as good as that of films comprising TINUVIN® 1577; particularly with regard to this property they should be superior to polyester films which comprise TINUVIN® 1577. In this context superior means equally long or longer stability against UV rays at lower concentration levels. Besides obvious economic advantages, a lower concentration level provides substantial technical advantages.

DETAILED DESCRIPTION OF ADVANTAGEOUS EMBODIMENTS OF THE INVENTION

The object of the present invention is achieved by the use of UV stabilizers according to the following formula (I):

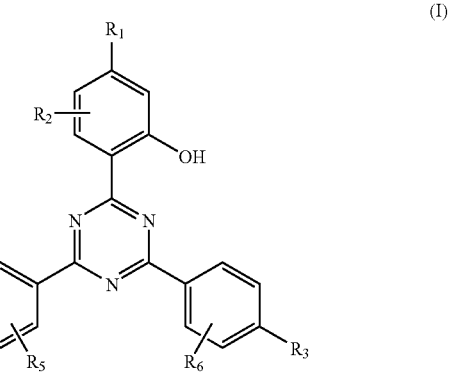

wherein $R_1$ is —H, —C1-C12-alkyl, -aryl, —S—(C1-C12)-alkyl or —O—$R_9$ or —O—(C1-C5)-alkylene-C(O)O—$R_9$, wherein $R_9$ is -aryl or —C1-C12-alkyl, $R_3$ and $R_4$ are

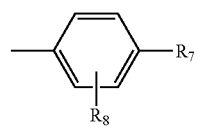

and $R_2$, $R_5$, $R_6$, $R_7$ and $R_8$ independently from each other represent —H, —(C1-C12)-alkyl, —O—(C1-C12)-alkyl, -aryl or —O-aryl, wherein said alkyl radicals with more than two C atoms and alkylene radicals with more than one C atom can be linear or branched.

Preferred are compounds according to formula (I), in which $R_1$ is —O—$R_9$ or —O—CH($CH_3$)—C(O)O—$R_9$, wherein $R_9$ stands for hexyl, heptyl or octyl and $R_2$, $R_5$, $R_6$, $R_7$ and $R_8$ represent —H.

Particularly preferred are compounds according to formula (I), in which
$R_1$ is —O—$R_9$, wherein
$R_9$ is octyl, specifically preferred 2-ethyl hexyl, and
$R_2$, $R_5$, $R_6$, $R_7$ and $R_8$ represent —H.

Particularly preferred are also compounds according to formula (I), in which
$R_1$ is —O—CH(CH$_3$)—C(O)O—$R_9$, wherein
$R_9$ stands for octyl and
$R_2$, $R_5$, $R_6$, $R_7$ and $R_8$ represent —H.

Aryl refers to unsubstituted mono or poly OH, Cl, Br, I, NO$_2$, NH$_2$, SO$_3$H, COOH, C1-C4-alkyl oder C1-C4-alkyloxy substituted phenyl, pyridyl, naphthyl, indanyl or indenyl, preferably phenyl, particularly preferably unsubstituted phenyl.

Particularly preferred is 2-(2-hydroxy-4-[1-octyloxycarbonylethoxy]phenyl)-4,6-bis(4-phenylphenyl)-1,3,5-triazine offered by Ciba SC (CH) under the name of TINUVIN® 479.

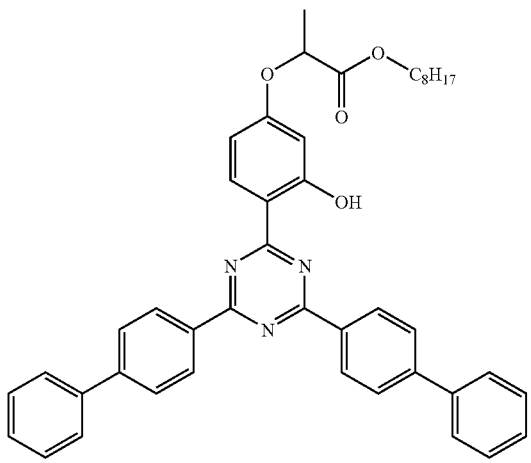

Also preferred are compounds according to formula (II)

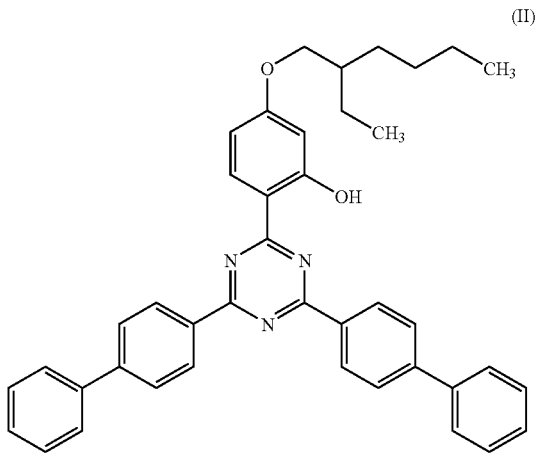

Said UV stabilizers are added in amounts of 0.1 to 10% by weight, preferably 0.25 to 4% by weight and particularly preferably 0.4 to 2.5% by weight.

Use of the particularly preferred compounds TINUVIN® 479 and/or the compound according to formula (II) yields the same UV stability at half the amount of TINUVIN® 1577.

Weight percentages mentioned in the following refer to the mass of the respective layer comprising said compound.

The polymer of the base layer B and the remaining layers of the film (without taking into consideration UV stabilizers and other additives mentioned hereafter) preferably comprise at least 80% by weight thermoplastic polyester. Suitable polyesters comprise, amongst others, of those made from ethylene glycol and terephthalic acid (=polyethylene terephthalate, PET), from ethylene glycol and naphthalene-2,6-dicarboxylic acid (=polyethylene-2,6-naphthalate, PEN), from 1,4-bishydroxymethylcyclohexane and terephthalic acid [=poly(1,4-cyclohexane dimethylene terephthalate), PCDT], and also from ethylene glycol, naphthalene-2,6-dicarboxylic acid and biphenyl-4,4'-dicarboxylic acid (=polyethylene 2,6-naphthalate bibenzoate, PENBB) and polyesters made from isophthalic acid and ethylene glycol, and also from any mixtures of said carboxylic acids and diols. Particularly preferred are polyesters made from at least 90 mol %, in particular from at least 95 mol % of ethylene glycol units and terephthalic acid units or of ethylene glycol units and naphthalene-2,6-dicarboxylic acid units. The remaining monomer units are derived from other aliphatic, cycloaliphatic, or aromatic diols and/or dicarboxylic acids.

Suitable other aliphatic diols are e.g. diethylene glycol, triethylene glycol, and aliphatic glycols according to the generic formula HO—(CH$_2$)$_n$—OH, wherein n is 1 to preferably less than 10.

Additionally the film polymer may contain up to 20% by weight other polymers such as polyolefins (e.g. cycloolefin polymers, polypropylene etc.), polyamides or polyetherimides. Preferably their amount is less than 10% by weight, and particularly preferably the polymer consists of 100% by weight of the aforementioned polyesters.

The film may additionally contain common additives such as stabilizers and/or antiblocking agents. Antiblocking agents are preferably used in the outer layers (layers A and C) of multi-layer films (ABC, B=base layer). Examples of stabilizers used are phosphorus compounds, such as phosphoric acid or phosphoric acid esters. Examples of further additives are radical scavengers/thermo stabilizers (e.g. IRGANOX®, preferably IRGANOX® 1010).

Typical antiblocking agents are inorganic and/or organic particles, e.g. calcium carbonate, crystalline or amorphous silica (SiO$_2$), talc, magnesium carbonate, barium carbonate, calcium sulfate, barium sulfate, lithium phosphate, calcium phosphate, magnesium phosphate, aluminum oxide, aluminum silicate, lithium fluoride, the calcium, barium, zinc, or manganese salts of the dicarboxylic acids used, titanium dioxide, kaolin, or crosslinked polystyrene particles, PMMA particles or acrylate particles.

Other antiblocking agents that can be used are mixtures of two or more different antiblocking agents or mixtures of antiblocking agents of the same composition but of different particle size. The antiblocking agents can be added to the individual layers in the respective advantageous amounts, e.g. in the form of a glycolic dispersion during polycondensation or by way of masterbatches during extrusion. Typically the amounts of antiblocking agents do not exceed 5% by weight, preferably not 1% by weight and those of the white pigments such as TiO$_2$ do not exceed 20% by weight.

In addition to the UV stabilizers of the present invention other UV stabilizers (e.g. other triazines, benzophenones etc.)—if appropriate—can be used (for a selection refer to DE-A-101 35 795, page 8, item 2) in amounts of preferably less than 2% by weight and particularly preferably less than 0.5% by weight. Compounds from the HALS class (hindered amine light stabilizers, see DE-A-101 35 795) have proven to be disadvantageous, however. Contrary to the prolonged lifetime of PP film described in example 7 of DE-A-101 35 795 the use of HALS stabilizers in polyester films did not appreciably extend the lifetime measured under UV irradiation; furthermore during weathering yellow discoloration already occurred after 500 hours and similarly a substantial yellow discoloration appeared when the film was reclaimed.

In the most preferred embodiment of the invention no additional stabilizers are used besides those according to the invention.

In a preferred embodiment of the invention 0.01 to 1% by weight, more preferably 0.01 to 0.1% by weight of radical scavengers (antioxidants) are added to one or more layers of the film. For a selection of radical scavengers (antioxidants) reference is made to DE-A-101 35 795, page 7, item 1. IRGANOX® 1010 (CAS-No. 6683-19-8) or the stabilizer with the CAS-No. 065140-91-2 from Ciba SC (CH) have proven to be particularly suitable.

In another preferred embodiment of the invention the film is rendered flame resistant. As flame retardants preference is given to organic phosphorus compounds that are soluble in polyester. Particularly preferred are phosphorus compounds that are incorporated into the polyester chain and among them preferably those in which the phosphorus atom(s) are located in a sidechain. An example of such a compound which can be incorporated into the polyester chain is the ester with CAS-No. 63562-34-5. The flame retardant is typically added in amounts such that the amount of phosphorus from the flame retardant amounts to 0.1 to 2% by weight.

According to the invention the total thickness of the polyester film is 1 to 500 µm, particularly 10 to 50 µm, and preferably 12 to 30 µm.

The film has one or more layers, across which all of the above additives can be included independently from each other. In multilayer films it has proven to be advantageous when the outer, light exposed layer (or in case of double sided light exposure and at least three-layered films, both outer layers) contain(s) more UV stabilizer than the inner layer/layers.

Economically and technically particularly advantageous embodiments are films with more than two layers in which more than 25%, preferably more than 30% and particularly preferably more than 35% of the UV stabilizer is contained in the outer layer(s), and particularly preferably one outer layer contains more than 25%, preferably more than 30% and particularly preferably more than 35% of the stabilizer.

It has proven advantageous, when the amount of UV stabilizer in each layer does not exceed 7% by weight, preferably when each layer does not contain more than 5% by weight UV stabilizer, since the stretch induced increase in crystallinity lowers the solubility of the UV stabilizer in the polyester matrix which may lead to exudation of UV stabilizer. Here TINUVIN® 479 has proven to be advantageous, because it apparently reacts with the polyester matrix and forms covalent bonds and exhibits a particularly low migration.

In multilayer embodiments it has proven advantageous, when at least the first two layers facing the incident light contain UV stabilizer. Preferably the amount of UV stabilizer in both of these two layers should not be lower than 0.1% by weight. In transparent embodiments (transparency >50%) it has proven advantageous when all layers of the film contain at least 0.1% by weight UV stabilizer.

When the light facing layer of the film contains less than 4% by weight of white pigment (e.g. $TiO_2$, $BaSO_4$, $CaCO_3$ etc.) with an average particle size $d_{50}$ of greater than 200 nm, it has proven advantageous, when the outer layer contains at least 0.75% by weight UV stabilizer and particularly preferably at least 1.0% by weight of UV stabilizer.

In a preferred embodiment the film according to the invention exhibits a longitudinal and transversal shrinkage of less than 10% at 200° C., preferably of less than 6% and particularly preferably of less than 4%. Further, at 100° C. the film exhibits an expansion of less than 3%, preferably of less than 1% and particularly preferably of less than 0.3%. This dimensional stability can be achieved e.g. by appropriate relaxation of the film prior to winding up (see process description).

In a preferred embodiment the film also exhibits an elastic modulus of greater than 3000 N/mm$^2$, preferably of greater than 3500 N/mm$^2$ and particularly preferably >4100 N/mm$^2$ in the longitudinal and transversal directions. The F5 parameters (force at 5% elongation) in the longitudinal and transversal directions preferably are in the range of greater than 80 N/mm$^2$ and preferably greater than 90 N/mm$^2$. These mechanical properties can be obtained e.g. through appropriate biaxial stretching of the film (see process description).

Said shrink and mechanical properties favorably influence the film durability under UV aging and other weather conditions such as heat and moisture.

In a further preferred embodiment the film is coated on at least one side with an adhesion agent for print colors. Suitable coatings are e.g. acrylates or copolyesters with a sulfoisophthalic acid content of greater than 0.2% by weight.

Process

The polyester matrix polymers of the respective layers are obtained by polycondensation, either starting from dicarboxylic acids and ethylene glycol (so called "PTA" process), or starting from the esters of dicarboxylic acids, preferably dimethyl esters and ethylene glycol (so called "DMT" process). Usable polyethylene terephthalates preferably have SV values in the range of from 600 to 900, and polyethylene-2,6-naphthalate from around 500 to 800.

Particles—if present—can already be added during the manufacture of the polyesters. For this purpose the particles are dispersed in ethylene glycol, optionally ground, decanted etc. and added to the reactor either in the (trans)esterification or polycondensation step. In a preferred alternative a concentrated polyester masterbatch containing particles or additives is prepared with a twin-screw-extruder and during film extrusion diluted with particle-free polyester. Further it is possible to add particles and additives directly to a twin-screw-extruder during film extrusion.

Non-cross-linked organic particles are either processed in a twin-screw-extruder to prepare a masterbatch, or are added directly during film extrusion.

The UV stabilizers can be added to the film via the masterbatch technology. For this purpose a polyester raw material is plastified in a twin-screw-extruder and the UV stabilizer is added. Subsequently the mixture is extruded through an orifice into a water bath and quenched and granulated. It has proven advantageous when the masterbatch contains UV stabilizer in an amount from 1 to 33% by weight, preferably from 5 to 25% by weight and particularly preferably from 10 to 20% by weight. Amounts below this range are rather uneconomical and above 25% by weight the bonding of the UV stabilizer in the polymer matrix becomes insufficient, which at values above 33% by weight causes noticeable "exudation".

The UV stabilizers can also be added directly during film production. For this purpose respective amounts of stabilizer are dosed directly into the extruder. However, this only yields good distribution results when multi-(at least two)-screw-extruders are used.

Further it has proven advantageous, when the extruder intake is covered with a layer of inert gas (e.g. nitrogen or argon), because in direct extrusion at the film manufacturing equipment as well as in masterbatch production the UV stabilizers according to the invention are sensitive toward oxidative stress caused by the high extrusion temperatures.

When single-screw-extruders are being used it has proven advantageous to pre-dry the polyesters. In case of twin-screw-extruders with a degassing zone the drying step can be omitted.

First, the polymer or polymer mixture of the layer, or in case of multilayer films of the individual layers are compressed and plastified in extruders. Then the melt(s) are formed into flat film melts via a single- or multilayer nozzle, pressed through a slit die (wide slit nozzle) and drawn off via a chill roll and one or more take-up rolls, causing the film to cool down and solidify.

The film according to the invention is biaxially oriented, i.e. biaxially stretched. The biaxial stretching of the film is generally carried out sequentially. It is preferable to first orient longitudinally (i.e. in machine direction=MD direction) and then to orient transversely (i.e. perpendicularly to machine direction=TD direction). Longitudinal stretching can be carried out with the aid of two rolls running at different speeds corresponding to the desired stretching ratio. For transverse stretching, an appropriate tenter frame is generally used.

Instead of sequential stretching simultaneous stretching is possible but not necessarily required.

The temperature at which the stretching is carried out, can vary over a relatively wide range and depends on the desired properties of the film. In general the longitudinal stretching is carried out in a temperature range from 80 to 130° C. (heating-up temperature from 80 to 130° C.) and in transversal direction in a temperature range from 90° C. (start of stretching) to 140° C. (end of stretching). The ratio of longitudinal stretching is in the range from 2.0:1 to 5.5:1, preferably from 2.2:1 to 5.0:1. The ratio of transversal stretching is in general in the range from 2.4:1 to 5.0:1, preferably from 2.6:1 to 4.5:1.

In order to obtain the desired film properties it has proven advantageous, when the stretching temperature (MD and TD directions) is below 125° C. and preferably below 118° C.

Prior to transverse stretching, one or both surfaces of the film can be in-line coated by known processes. In-line coating can by way of example result in improved adhesion of a metal layer or printing ink, or else for improvement of antistatic performance or of processing performance. When the outer co-extruded layer does not contain particles for improvement of slip and winding characteristics, a particle containing coating can be applied at this stage.

During the subsequent heat setting the film is maintained under tension for a time period of about 0.1 to 10 s at a temperature of 150 to 250° C. and in order to obtain the preferred shrink value, relaxed in transversal direction by at least 1%, preferably by at least 3% and particularly preferably by at least 4%. The relaxation is preferably carried out in a temperature range from 150 to 190° C. Preferably less than 25% and greater than 5% of the total relaxation occurs within the first 25% of the relaxation time. The film is then conventionally wound up.

During film production it is ensured, that reclaimed material can be reintroduced to the extrusion process in an amount of 20 to 60% by weight relative to the total weight of the film, without any significant adverse effect on the physical and optical properties of the film.

The film according to the invention exhibits a very good UV stability, low intrinsic color and in comparison to TINUVIN® 1577 reduced content of UV stabilizer at the same UV stability and reduced odor nuisance during film manufacture. Further it has been shown, that due to the lower amounts of the new stabilizers the die-pressure variation, which occurs during film manufacture when switching back and forth between UV stabilized and non-stabilized film types, can be reduced such that fewer film breaks are observed upon switch-over.

The following test methods have been used to characterize the raw materials and the films:

Measurement of Median Diameter $d_{50}$

The median diameter $d_{50}$ is determined via laser on a Horiba LA 50 using laser diffraction (other measurement instruments are e.g. Malvern Master Sizer or Sympathec Helos, which use the same measurement principle). For this purpose the specimens are placed with water in a cuvette and this is then mounted in the measurement equipment. The dispersion is scanned via laser and the particle size distribution is determined through comparison of the signal with a calibration curve. The particle size distribution is characterized by two parameters, the median $d_{50}$ (=measure for the average value) and the variance, the so called SPAN98 (=measure for the variance of the particle diameter). The measurement procedure is automatic and also includes the mathematical determination of the $d_{50}$ value. According to its definition the $d_{50}$ value here is determined from the "relative" cumulative particle size distribution curve: The intersection of the 50% ordinate value with the cumulative curve yields on the abscissa axis the desired $d_{50}$ value.

Primary Grain Size of Nano Particles (e.g. AEROSOL® and NYACOL®)

The average size of primary particles is determined via transmission electron microscope (TEM) images of the particles under investigation. When the specimen is provided as film or granules the TEM inspection is to be carried out using microtome slices.

Transparency

The transparency is measured according to ASTM-D 1033-77.

SV Value (Standard Viscosity)

The standard viscosity SV is measured according to DIN 53 726 in dichloroacetic acid (DCA) at a concentration of 1% by weight. From the relative viscosity ($\eta_{rel}$) the dimensionless SV value is determined as follows:

$$SV = (\eta_{rel} - 1) \times 1000$$

The intrinsic viscosity (IV) is related to the standard viscosity as follows:

$$IV[\eta] = 6.907 \cdot 10^{-4} SV(DCA) + 0.063096 \text{ [dl/g]}$$

Mechanical Properties

The mechanical properties are determined based on DIN EN ISO 572-1 and -3 using film strips of size 100 mm×15 mm. The change in length is measured via a traverse position sensor. The elastic modulus is determined at a pull velocity of 10% per min as the slope between 0.2 and 0.3 extension. The σ5-value (force at 5% extension) is measured at a pull velocity of 100% per min.

Shrinkage

The thermal shrinkage is determined using a square film specimen with side length of 10 cm. The specimen are measured precisely (side length $L_0$), tempered for 15 min at 200° C. in a forced convection drying cabinet and then measured precisely at room temperature (side length L). The shrinkage is obtained from the equation $$\text{shrinkage } [\%] = 100(L_0 - L)/L_0$$

UV Stability

The UV stability is measured as described in DE-A-697 31 750 (DE equivalent of WO 98/06575) on page 8 and the UTS value is given as a percentage of the initial value. Concerning the weathering time reference is made to the below-mentioned examples.

Odor Nuisance in Production

As odor nuisance is subjective ten production workers were independently queried about their odor perception after 30 min of production time. Each worker had to rate the odor on a scale from 1 to 4 (see below). The odor ratings were summed and divided by the number of workers and displayed as average values. Rating value:

1 Comparing to "normal" polyester film production no additional odor discernable 2 Light additional odor appreciable (no nuisance)

3 Clearly appreciable odor (nuisance)

4 Strong additional odor (very disturbing/unpleasant)

EXAMPLES

Comparative Example 1

Example 1 of DE-A-697 31 750 (DE equivalent of WO 98/06575) was reproduced including the following differences:

Due to lack of raw material with silicon dioxide particles of 6 μm, 1.1% by weight of silicon dioxide of type SILYSIA® 440 (from Fuji Silysia, JP, with $d_{50}$ of ca. 4.4 μm) was used. The polyethylene terephthalate raw material for the non-sealable layer (IPA content of 0.05% by weight, diethylene glycol 0.7% by weight) contained 1% by weight TINUVIN® 1577 (Ciba SC, Switzerland). The TINUVIN® was added via a masterbatch consisting of 10% by weight of TINUVIN® 1577 in PET.

The heat setting was performed as follows:

| Heat setting | Temperature | 225-150 | ° C. |
|---|---|---|---|
| | Duration | 2 | s |
| | Relaxation in TD direction at 200 to 150° C. | 3 | % |

The odor was rated at 2.5.

Upon switch-over to this film type minor pressure variations in the die were observed. The value of tensile strength (UTS) after 1000 hours of weathering was 69% of the initial value.

Example 1

Like Comparative Example 1, but 0.5% by weight TINUVIN® 479 (Ciba SC, CH).

The odor was rated at 1.4.

Upon switch-over to this film type no pressure variations in the die were observed.

The value of tensile strength (UTS) after 1000 hours of weathering was 74% of the initial value.

Example 2

Like example 1, but 1.0% by weight TINUVIN® 479 (Ciba SC, CH).

Upon switch-over to this film type minor pressure variations in the die were observed.

The odor was rated at 1.8.

The value of tensile strength (UTS) after 1000 hours of weathering was 89% of the initial value.

Example 3

A three-layered film with thickness of 20 μm was manufactured.

The polymer mixtures were fed together to a pinole (adapter) and through a slit die and deposited electrostatically onto a chill roll maintained at 60° C. Then the film was stretched longitudinally and then transversally under following conditions:

| Longitudinal stretching | Heating temperature | 75-115 | ° C. |
|---|---|---|---|
| | Stretching temperature | 115 | ° C. |
| | Longitudinal stretching ratio | 3.7 | |
| Transverse stretching | Heating temperature | 100 | ° C. |
| | Stretching temperature | 110 | ° C. |
| | Transversal stretching ratio | 4.0 | |
| Heat setting | Temperature | 237-150 | ° C. |
| | Duration | 2 | s |
| | Relaxation in TD at 200 to 150° C. | 7 | % |

Three polymer mixtures were plastified in three twin-screw-extruders at 290° C.:

1. 70% by weight polyethylene terephthalate with an SV value of 800 with 0.1% by weight $SiO_2$ SILYSIA® 340 (Fuji Silysia, JP) and 30% by weight of a polyethylene terephthalate masterbatch with SV value of 700 and a TINUVIN® 479 content of 20% by weight→Layer A
2. 98% by weight polyethylene terephthalate with an SV value of 800 and with 2% by weight a polyethylene terephthalate masterbatch with an SV value of 700 and a TINUVIN® 479 content of 20% by weight→Layer B
3. 99% by weight polyethylene terephthalate with an SV value of 800 with 0.1% by weight $SiO_2$ SILYSIA® 340 (Fuji Silysia, JP) and 1% by weight of a polyethylene terephthalate masterbatch with an SV value of 700 and a TINUVIN® 479 content of 20% by weight→C-layer TINUVIN® 479 was admixed into commercial PET polymer via a twin-screw-extruder. The $SiO_2$ particles had already been added during polycondensation. The IPA (=isophthalic acid) content of the polyesters was 0.1% by weight and the DEG (diethylene glycol) content was 1% by weight.

The polymer mixtures were fed together to a pinole (adapter) and through a slit die and deposited electrostatically onto a chill roll maintained at 60° C. Then the film was stretched longitudinally and then transversally under following conditions:

| Longitudinal stretching | Heating temperature | 75-115 | ° C. |
|---|---|---|---|
| | Stretching temperature | 115 | ° C. |
| | Longitudinal stretching ratio | 3.7 | |
| Transverse stretching | Heating temperature | 100 | ° C. |
| | Stretching temperature | 110 | ° C. |
| | Transversal stretching ratio | 4.0 | |
| Heat setting | Temperature | 237-150 | ° C. |
| | Duration | 2 | s |
| | Relaxation in TD at 200 to 150° C. | 7 | % |

The thus obtained film had a total thickness of 20 μm, and the outer layer A was 5 μm thick and the outer layer C was 2 μm thick. The transparency was 88%, the elastic modulus in MD 4920 N/mm² and in TD 5105 N/mm². The F5 value in MD was 100 N/mm² and in TD 102 N/mm². The shrinkage in MD at 200° C. was 2.7%, and 0.1% in TD.

Upon switch-over to this film type no pressure variations in the extruder of the base layer B were observed. Due to the thicker and stable base layer B small variations in the extruder of layer A had no influence on the operational stability of the film manufacturing equipment.

The odor was rated at 1.8.

The tensile strength (UTS) after 1000 hours of weathering (light incidence through layer A) was 91% of the initial value and after 3000 hours 67% of the initial value.

Example 4

Like comparative example 1, but 0.5% by weight of the compound according to formula (II) (CGX UVA 006) (Ciba SC, CH).

The odor was rated at 1.8.

Upon switch-over to this film type no pressure variations in the die were observed. The value of tensile strength (UTS) after 1000 hours of weathering was 70% of the initial value.

That which is claimed:

1. Biaxially oriented mono- or multilayered polyester film comprising (i) polymer consisting of polyester and, optionally, up to 20% by weight of polyamide or polyetherimide and (ii) at least one UV stabilizer according to formula (I):

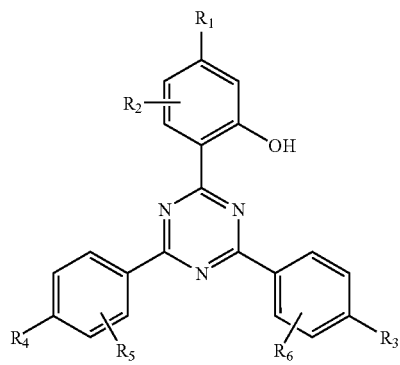

(I)

wherein
$R_1$ is —H, —C1-C12-alkyl, -aryl, —S—(C1-C12)-alkyl or —O—$R_9$ or —O—(C1-C5)-alkylene-C(O)O—$R_9$, wherein
$R_9$ is -aryl or —C1-C12-alkyl,
$R_3$ and $R_4$ are

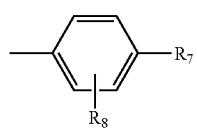

and
$R_2$, $R_5$, $R_6$, $R_7$ and $R_8$ independently from each other represent —H, —(C1-C12)-alkyl, —O—(C1-C12)-alkyl, -aryl or —O-aryl,
wherein said alkyl radicals with more than two C-atoms and alkylene radicals with more than one C-atom can be linear or branched.

2. Polyester film according to claim 1, said film comprising at least one UV stabilizer according to formula (I) wherein:
$R_1$ represents —O—$R_9$ or —O—CH(CH3)-C(O)O—$R_9$, wherein
$R_9$ stands for hexyl, heptyl or octyl and
$R_2$, $R_5$, $R_6$, $R_7$ and $R_8$ represent —H.

3. Polyester film according to claim 1, said film comprising at least one UV stabilizer according to formula (I) wherein:
$R_1$ is —O—$R_9$, wherein
$R_9$ is octyl, and
$R_2$, $R_5$, $R_6$, $R_7$ and $R_8$ represent —H.

4. Polyester film according to claim 1, said film comprising at least one UV stabilizer according to formula (I) wherein:
$R_1$ is —O—CH(CH$_3$)—C(O)O—$R_9$, wherein
$R_9$ stands for octyl and
$R_2$, $R_5$, $R_6$, $R_7$ and $R_8$ represent —H.

5. Polyester film according to claim 1, wherein the film is monolayered.

6. Polyester film according to claim 1, wherein the film is multilayered.

7. Polyester film according to claim 1, wherein the film comprises one or more UV stabilizers according to formula (I) in an amount of from 0.1 to 10% by weight (relative to the mass of the layer containing the UV stabilizer).

8. Polyester film according to claim 1, wherein the film comprises one or more stabilizers and/or antiblocking agents.

9. Polyester film according to claim 1, wherein the film comprises a radical scavenger.

10. Polyester film according to claim 1, wherein the film comprises a flame retardant.

11. Polyester film according to claim 7, wherein the film has more than two layers and more than 25% of the total UV stabilizer is contained in one or both outer layer(s).

12. Polyester film according to claim 7, wherein the film has more than two layers and more than 25% of the total UV stabilizer is contained in one outer layer.

13. Polyester film according to claim 6, wherein no layer comprises more than 7% by weight of UV stabilizer (relative to the mass of the layer containing the UV stabilizer).

14. Polyester film according to claim 1, wherein the film shrinkage at 200° C. in longitudinal and transverse direction is less than 10%.

15. Polyester film according to claim 1, wherein the film expansion at 100° C. is less than 3%.

16. Polyester film according to claim 1, wherein the elastic modulus in longitudinal and transverse direction is greater than 3000 N/mm².

17. Polyester film according to claim 1, wherein the F5-value (force at 5% extension) in longitudinal and transverse direction is greater than 80 N/mm².

18. Process for manufacturing a polyester film according to claim 1, said process comprising
compressing and plastifying a polymer or a polymer mixture for a layer, or in case of multilayer films for the individual layers, in an extruder(s),
forming the compressed and plastified polymer through a single- or multilayer nozzle into a flat plastified film;
pressing the flat plastified film through a slit die;
drawing off the pressed film via a chill roll and one or more take-up rolls;

biaxially stretching, heat settting and winding up the drawn-off film,
wherein at least one layer of the film comprises a UV stabilizer according to formula (I).

19. Polyester film according to claim 1, wherein $R_9$ is 2-ethyl hexyl.

20. Polyester film according to claim 1, wherein said UV stabilizer is 2-(2-hydroxy-4-[1-octyloxycarbonylethoxy]phenyl)-4,6-bis(4-phenylphenyl)-1,3,5-triazine or a compound according to formula (II)

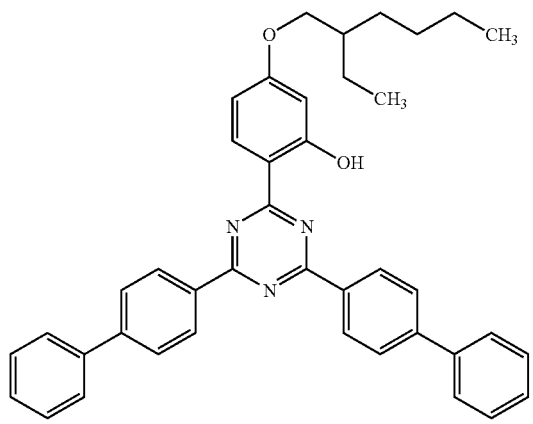

and said film exhibits the same or improved UV stability in comparison to an identical film containing twice the amount of 2-(4,6-diphenyl-1,3,5-triazine-2-yl)-5-(hexyl)oxyphenol in lieu of said UV stabilizer.

21. Biaxially oriented mono- or multilayered polyester film comprising at least one UV stabilizer according to formula (I):

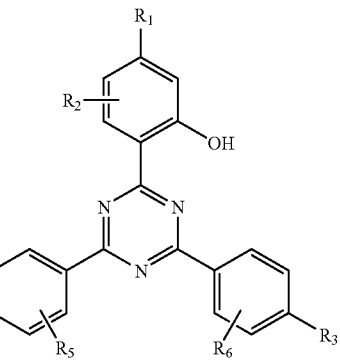

wherein
$R_1$ is —H, —C1-C12-alkyl, -aryl, —S—(C1-C12)-alkyl or —O—$R_9$ or —O—(C1-c5)-alkylene-C(O)O—$R_9$, wherein
$R_9$ is -aryl or —C1-C12-alkyl
$R_3$ and $R_4$ are

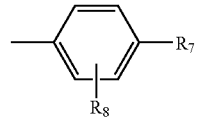

and
$R_2$, $R_5$, $R_6$, $R_7$ and $R_8$ independently from each other represent —H, —(C1-C12)-alkyl, —O—(C1-C12)-alkyl, -aryl or —O-aryl,
wherein said alkyl radicals with more than two C-atoms and alkylene radicals with more than one C-atom can be linear or branched
and said film retains a tensile strength after 1000 hours of weathering of 70% to 91% of its initial value.

* * * * *